(12) United States Patent
Oksman et al.

(10) Patent No.: US 10,917,187 B2
(45) Date of Patent: Feb. 9, 2021

(54) APPARATUS AND METHOD FOR MITIGATING INTERFERENCE IN NETWORK DISTRIBUTION

(71) Applicant: MAXLINEAR, INC., Carlsbad, CA (US)

(72) Inventors: Vladimir Oksman, Morganville, NJ (US); Rainer Strobel, Munich (DE)

(73) Assignee: MaxLinear, Inc., Carlsbad, CA (US)

( * ) Notice: Subject to any disclaimer, the term of this patent is extended or adjusted under 35 U.S.C. 154(b) by 153 days.

(21) Appl. No.: 16/009,235

(22) Filed: Jun. 15, 2018

(65) Prior Publication Data

US 2019/0044636 A1 Feb. 7, 2019

Related U.S. Application Data

(60) Provisional application No. 62/559,732, filed on Sep. 18, 2017.

(51) Int. Cl.

| H04J 1/12 | (2006.01) |
|---|---|
| H04L 12/66 | (2006.01) |
| H04L 12/28 | (2006.01) |
| H04L 25/02 | (2006.01) |
| H04L 12/26 | (2006.01) |
| H04L 1/00 | (2006.01) |
| H04L 12/24 | (2006.01) |
| H04B 3/32 | (2006.01) |
| H04Q 11/04 | (2006.01) |

(Continued)

(52) U.S. Cl.
CPC ............. *H04J 1/12* (2013.01); *H04B 1/005* (2013.01); *H04B 3/32* (2013.01); *H04J 3/10* (2013.01); *H04L 5/023* (2013.01); *H04L 12/2803* (2013.01); *H04L 12/2834* (2013.01); *H04L 12/2898* (2013.01); *H04L 12/66* (2013.01); *H04L 25/0202* (2013.01); *H04L 41/0806* (2013.01); *H04L 43/10* (2013.01); *H04L 43/12* (2013.01); *H04M 11/06* (2013.01); *H04Q 11/04* (2013.01)

(58) Field of Classification Search
CPC ....... H04B 3/32; H04B 3/487; H04M 11/062; H04M 11/068; H04M 11/06; H04L 5/023; H04L 27/2656; H04J 3/10
See application file for complete search history.

(56) References Cited

U.S. PATENT DOCUMENTS 5,991,311 A * 11/1999 Long .................. H04L 5/023
370/524
6,535,580 B1 * 3/2003 Strauss ................ H04M 3/301
379/1.03

(Continued)

*Primary Examiner* — Christopher M Crutchfield
(74) *Attorney, Agent, or Firm* — Maschoff Brennan

(57) ABSTRACT

A residential gateway connecting an access network to an in-home network includes an access network transceiver configured for a first communication with an access network component via a wireline and an in-home network transceiver configured for a second communication with an in-home network component via the same wireline or at least one further wireline. The residential gateway further includes synchronization circuitry configured to synchronize a timing between the first and the second communication and interference mitigation circuitry configured to mitigate interference between the first and the second communication based on the synchronized timing.

16 Claims, 7 Drawing Sheets

(51) Int. Cl.
*H04M 11/06* (2006.01)
*H04J 3/10* (2006.01)
*H04L 5/02* (2006.01)
*H04B 1/00* (2006.01)

(56) References Cited

U.S. PATENT DOCUMENTS

| | | | |
|---|---|---|---|
| 6,975,654 B1* | 12/2005 | Domon | H04L 12/40052 370/509 |
| 7,088,680 B1* | 8/2006 | Freitag, Jr. | H04J 3/04 370/236 |
| 2003/0147523 A1* | 8/2003 | Watson | H04L 12/2803 379/344 |
| 2005/0213648 A1* | 9/2005 | Chow | H04L 5/14 375/222 |
| 2007/0036340 A1* | 2/2007 | Rhee | H04M 3/304 379/399.01 |
| 2007/0047733 A1* | 3/2007 | Bremer | H04M 1/76 379/416 |
| 2007/0058595 A1* | 3/2007 | Classon | H04L 1/1812 370/337 |
| 2008/0225687 A1* | 9/2008 | Oksman | H04L 41/0893 370/201 |

* cited by examiner

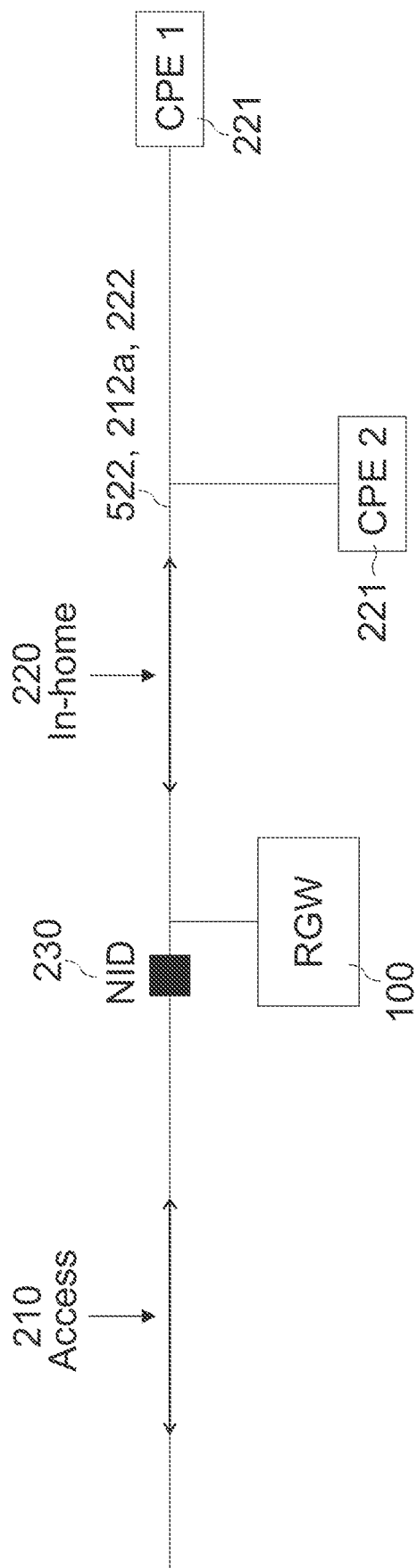

APPARATUS AND METHOD FOR MITIGATING INTERFERENCE IN NETWORK DISTRIBUTION

CROSS REFERENCE TO RELATED APPLICATIONS

This application claims priority under 35 U.S.C. § 119(e) to U.S. provisional application No. 62/559,732, entitled "Synchronized access and in-home distribution with crosstalk cancellation" and filed Sep. 18, 2017, which is incorporated by reference as if fully set forth herein.

FIELD

The present disclosure relates to networking technologies, and, in particular, to apparatuses and methods for mitigating interference in network distribution.

BACKGROUND

Modern wired access systems can bring huge bandwidth to premises. Distribution of this bandwidth inside the premises to multiple user devices or applications is necessary and still a problem in a number of typical scenarios. In a typical residence, only two media types are present: phone wiring and power lines. Both types of wiring have a rather substantial mutual crosstalk.

Thus, there is a need to mitigate crosstalk and interference when distributing bandwidth to premises.

BRIEF DESCRIPTION OF THE FIGURES

Some examples of apparatuses and/or methods will be described in the following by way of example only, and with reference to the accompanying figures, in which

FIG. 7 shows a schematic illustration of an RGW in a different location minimizing interference with respect to the location depicted in FIG. 5; and FIG. 8 shows a schematic illustration of an example of alternating access and in-home transmission frames.

DETAILED DESCRIPTION

Figure 1:
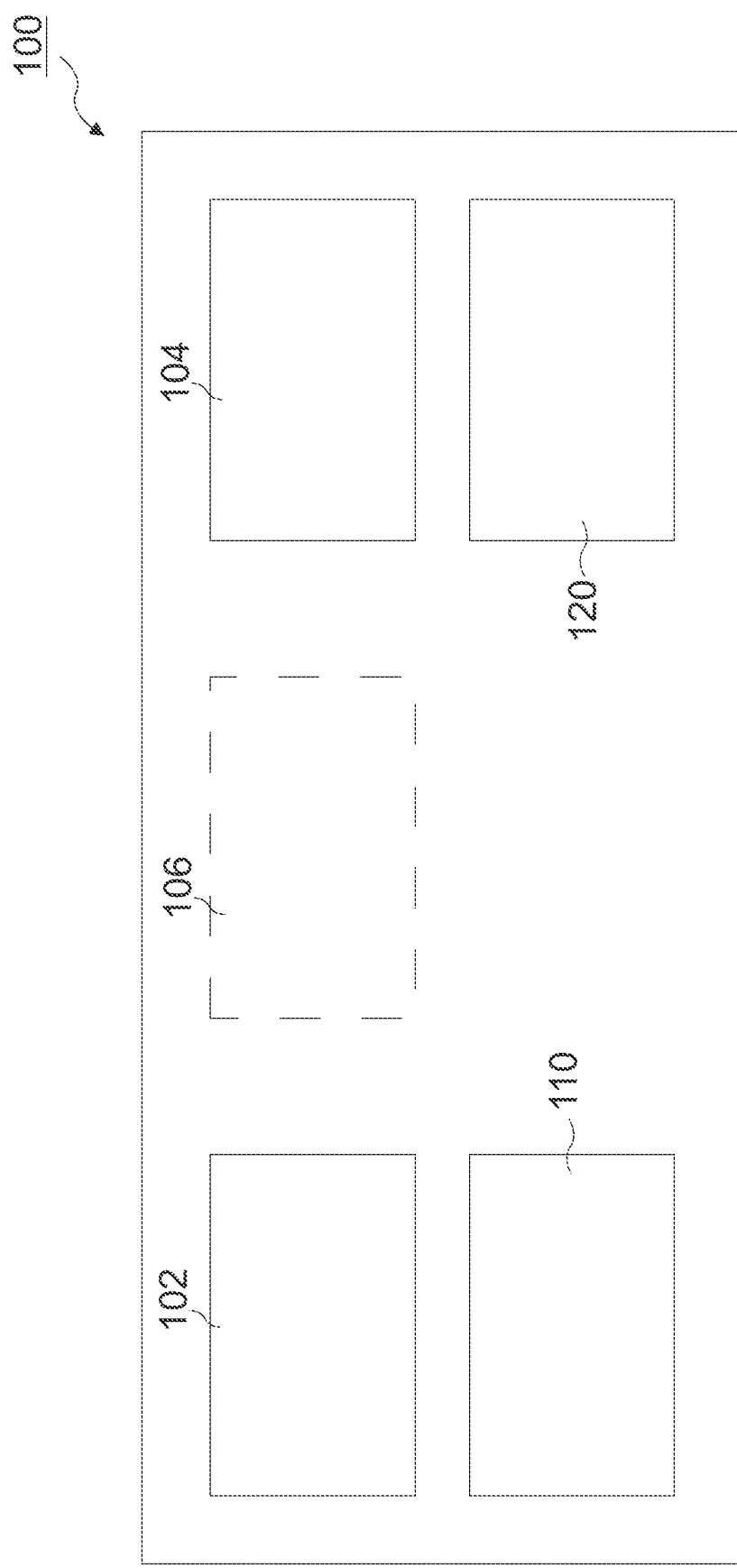
FIG. 1 shows a schematic illustration of a residential gateway.

Bandwidth is generally distributed via a backhaul network (e.g. fiber, satellite) to an access network which then distributes the network to residential gateways (RGW). Typically, access networks may be terminated at the customer premises at the RGW. Further, in-home distribution may be from the RGW to the in-home network by WiFi networking or by one of the existing in-home wired networking technologies.

WiFi has limited range and can lose bandwidth in houses built from concrete, bricks, or similar material. Industrial WiFi reach extenders can have 50% loss of bandwidth and they can increase egress, adding more noise sources for neighbors.

With modern wideband access networks, the current in-home networking systems can only be used if deployed over different type of medium than access network, such that the crosstalk between in-home and access networks is sufficiently small. Examples are access via coax wiring and in-home distribution via phone wires or power line. Another example is access via phone wiring and in-home distribution via coax wiring. Another example is access via coax at low frequencies and in-home distribution via the same coax on high frequencies.

However, in a typical residence, often only two media types are present: phone wiring and power line. Both types of wiring can have a rather substantial mutual crosstalk, which can be partially mitigated on low frequencies (e.g., up to 30 MHz). However, for the bit rates currently required, a much wider transmission spectrum has to be used, and thus the crosstalk may be impractically high. This crosstalk cannot always be mitigated by conventional methods, which assume independence between access and in-home networking. Besides, the capacity of power lines is sometimes low and even connection to some points inside the premises may not be possible.

Extending of in-home networking up to the access head-end or using access networking technology that allows point-to-multipoint (P2MP) topology inside the premises may be another approach that provides multiple terminations inside premises. Disadvantages of this method, however, are performance loss (due to no crosstalk cancellation possible and loss of access capacity for in-home communications). The latter cause difficulties for operators to provide certain types of services.

The present disclosure is directed to an access network that uses a traditional point-to-point (P2P) topology that is terminated at the residential gateway (RGW), while the in-home network is deployed from the RGW to multiple in-premise devices (CPEs). However, the access and in-home networks may apply special protocols that can facilitate efficient crosstalk cancellation between the access network and the in-home network, while also crosstalk between lines of the access network (connecting different residences) may be cancelled. For use of the proposed protocols, both access and in-home networks may apply the same tone spacing and symbol timing, and can also be synchronized by their transmission frames and symbol positions. With this, since co-located, efficient crosstalk cancellation between in-home and access systems may be implemented, which allows both them operate efficiently.

Tone spacing refers to a spacing between subcarrier frequencies of the whole bandwidth of a discrete multitoned (DMT) or orthogonal frequency division multiplexing (OFDM) symbol. Symbol timing synchronization refers to a synchronization between the timing of symbols (e.g. according to a sampling clock) in a receiver with that of a transmitter. Symbol positions refer to the order and time position of transmitted symbols in the frame.

One reason for a possible performance gain may be because the RGW isolates the access network from in-home network: no crosstalk from the in-home network and no in-home traffic affect the access network. This is especially efficient with emerging access systems, which can be deployed from very short distances (e.g., from 100 m, from which ~30 m is in-home wiring), because termination at the RGW may substantially reduce the distance that the access network has to cover. With shortened distance, the bit capacity of the access network can grow substantially, while the in-home network may also work over short distances (in-home part only) and can gain very high bit rates even using reduced low transmit power. Thus, even loss of transmission time by both in-home and access networks associated with crosstalk mitigation or avoidance may cause relatively small mutual performance loss. Even with 100% crosstalk avoidance, decent performance can be obtained even in case in-home and access networks are both deployed on the same wiring (e.g., on the same phone line). Thus, an efficient high-speed connection may be available for multiple WiFi points in the residence, which may allow for facilitating 5G services through the RGW.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIG. 1 shows a schematic illustration of a residential gateway (RGW) 100. The RGW 100 comprises an access network transceiver 110, an in-home network transceiver 120, synchronization circuitry 102, and interference mitigation circuitry 104. An RGW is a device that connects a local area network (LAN), such as an in-home network, to a wide area network (WAN), such as the access network. For example, the RGW may be a cable or DSL (digital subscriber line) modem.

The access network transceiver 110 is configured for a first communication with an access network component via a wireline. The access network component may be, for example, a distribution point unit (DPU). The access network transceiver 110 communicates with (the transceiver of) an access network component via access upstream (US) transmissions (transmitted from the access network transceiver 110 of the RGW 100 to the associated transceiver of the access network component) and access downstream (DS) transmissions (transmitted from the transceiver of the access network component to the access network transceiver 110 of the RGW 100).

The in-home network transceiver 120 is configured for a second communication with one or more in-home network components via the same wireline or at least one further wireline. The in-home network transceiver 120 communicates with (the transceiver of) in-home CPE via RGW transmissions (transmitted from the in-home network transceiver 120 of the RGW 100 to the associated transceivers in the CPE) and CPE transmissions (transmitted from the transceiver of in-home CPE to the in-home network transceiver 120 of the RGW 100). The in-home network component may be, for example, one or more customer premise equipment (CPE). The access and in-home network components (e.g. DPU and/or CPE) with which the corresponding access network transceiver 110 and in-home network transceiver 120 communicate with are described in more detail in connection with FIG. 2.

Synchronization circuitry 102 is configured to synchronize a timing between the first and the second communication. This may be accomplished by synchronizing the tone spacing, symbol timing, and symbol positions of transmissions between the RGW, the access network component, and in-home network component(s). The RGW can be loop-timed to the access network component, and the in-home network components can be loop-timed to the RGW. If the access line is disconnected, the RGW can slip to its local clock and the in-home network continues working. When the access line is reconnected, the RGW loop timing may be restored.

The time position of access US symbols may be controlled by the access network component. The time position of in-home network symbols transmitted by the RGW may be aligned with the time position of access US symbols transmitted by RGW (which are synchronized to the access network component). The time position of in-home symbols transmitted by in-home network components (e.g. CPE) may be controlled by the RGW so that it's aligned at the entrance of the RGW in-home network transceiver such as requested by the RGW. In other words, the access network component may set the timing which the RGW synchronizes to, and, in turn, the RGW may set (the same) timing which the in-home network components then synchronize to. The time positions of sync symbols (or other symbols carrying the probe sequences for crosstalk channel estimation between in-home and access systems) may be aligned.

The duration of access network transmission frames can be an integer number of symbol periods. Since the in-home network is synchronized to the access network, the transmissions frames of the in-home network can be aligned in time with those of their peers at the access network to which they are synchronized to.

The interference mitigation circuitry 104 is configured to mitigate interference between the first and the second communication based on the synchronized timing. In some examples, the interference may be mitigated by pre- or post-compensating for known or predicted interference or crosstalk. In some examples, the interference may be mitigated by resource division duplexing the transmissions within a given transmission frame. In some examples, the interference may be mitigated by altering the transmission frames entirely. These varying examples will be discussed in more detail in connection with the remaining figures.

Optionally, the RGW 100 may further comprise channel estimation circuitry 106 configured to estimate at least one crosstalk estimate associated with a crosstalk between the first and the second wireline. The channel estimates may be based on probe sequences sent or received by the RGW as described in more detail in FIG. 3.

More details and aspects are mentioned in connection with the examples described above or below. The example shown in FIG. 1 may comprise one or more optional additional features corresponding to one or more aspects mentioned in connection with the proposed concept or one or more examples described below (e.g. FIGS. 2-8).

Figure 2:
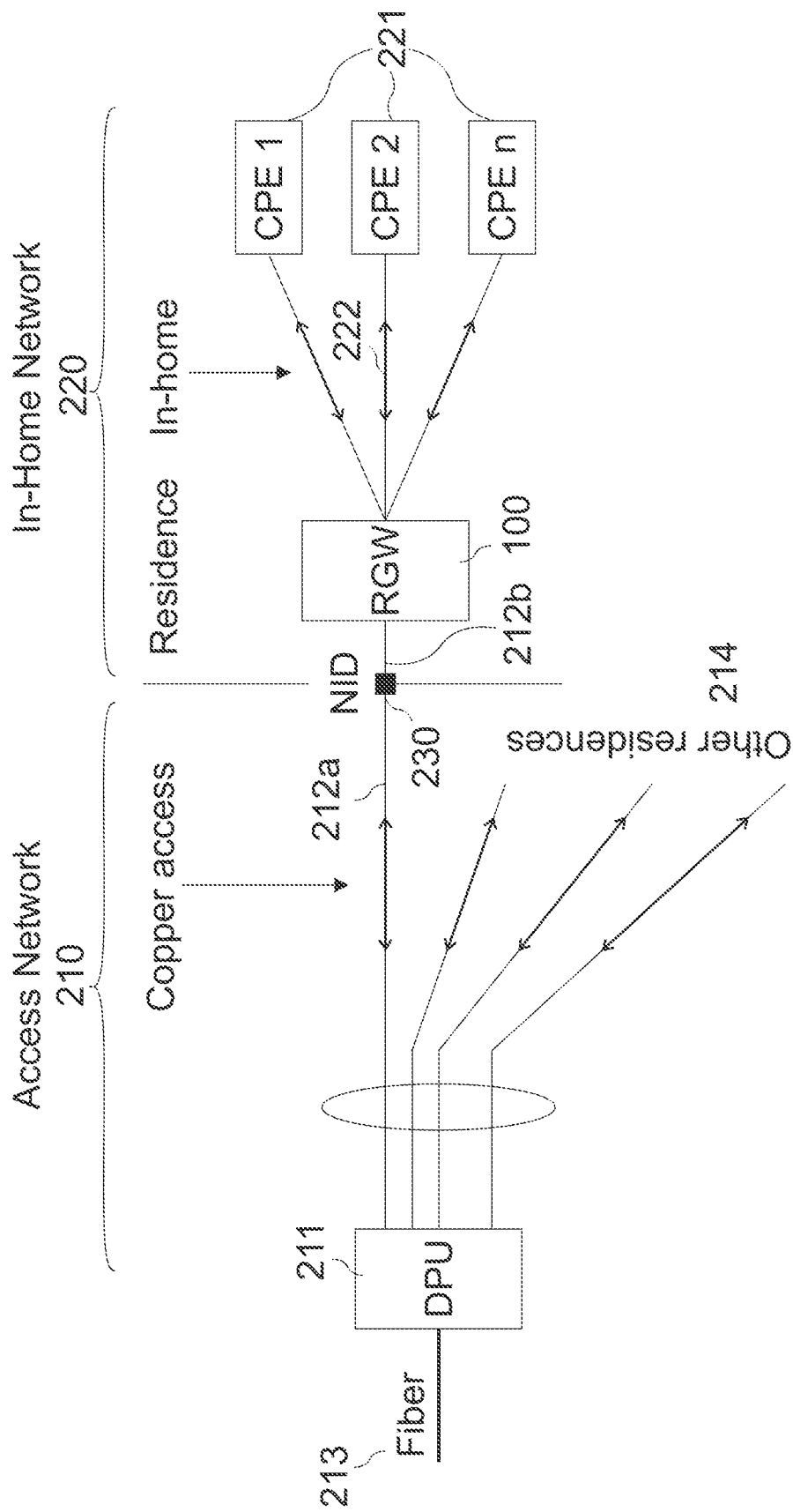
FIG. 2 shows a schematic illustration of an access network connected to an in-home network via a residential gateway RGW on separate channels.

FIG. 2 shows a schematic illustration of an access network 210 connected to an in-home network 220 via a residential gateway RGW 100 on separate channels (e.g. separate wirelines 212 and 222). The access network 210 may be connected to a backhaul fiber 213 via an access network component (shown here as a distribution point unit, DPU) 211. The DPU 211 may connect to the RGW 100 via wireline 212. Wireline 212 may comprise an access wireline section 212a leading up to a network interface demarcation (NID) 230, and an in-home wireline section 212b leading from the NID 230 to the RGW 100. The in-home network 220 may comprise one or more customer premise equipment (CPE) 221 connected to the RGW 100 via one or more wirelines 222.

The overall system shown in FIG. 2 contains two networks: an access network 210 (in the presented example shown as "copper access" to distinguish from "fiber") and an in-home network 220.

The access network 210 comprises an access network component (e.g. DPU 211) which can contain multiple access transceivers connected to multiple RGWs 100, each RGW 100 being located at a particular customer residence (premises). Only one RGW 100 is shown connected to DPU 211 via wireline 212 in FIG. 2; additional RGWs may be individually located at each residence, connected to the DPU via their respective wirelines along the connections labeled "other residences" 214. The connection from the DPU 211 to the RGW 100 is point-to-point (P2P).

The DPU 211 may be connected to the backhaul fiber 213, connecting the access network 210 to a backhaul network. The backhaul network refers to core network infrastructure which connect and distribute bandwidth to the access network. Although fiber is used in the example shown in FIG. 2, any backhaul network distribution (e.g. free-space optical, satellite, fiber) may be used to connect the core network to the DPU 211. The related part of the RGW 100 is an access network transceiver connected to its peer at the DPU 211 via wireline 212. Wireline 212 comprises two sections: (street) access line 212a which connects to the (in-home) access line 212b leading to the RGW 100 at the NID 230.

The NID 230 generally (but not always) marks the point at which responsibility for the maintenance of wiring and related equipment shifts from the service provider (from the backhaul network up to the NID 230) to the consumer (from the NID 230 to the in-home network as desired). Wireline 212a may be, for example, cabling external to the customer's building provided by the service provider (e.g. cables running from a DPU in the street to the NID located in the basement of the customer's building). Wireline 212b may be in-home or in-building wiring from the NID 230 to the RGW 100. As previously described, many customer residences have only limited wiring types available; in some cases, wireline 212b and in-home wireline 222 may be run in parallel (e.g. as part of the same cable). Wireline 212b and 222 may be separate channels within the wire (e.g. different twisted pairs) or they may be the same channel (e.g. the same twisted pair). The cable containing wireline 212a may be routed near the cable containing wirelines 212b and 222, particularly near the NID 230.

The in-home network 220 may comprise one or more CPEs 221 connected to the RGW 100 via wirelines 222. The CPE 221 may be telephones, routers, switches, splitters, or other active or passive devices that allow consumers to access communication service providers' services, and/or to distribute them around the consumer premises (e.g. via LAN). The in-home transceiver(s) of the RGW 100 are peers to the CPEs 221, which for the purpose of this disclosure, the CPEs 221 are equivalent to transceivers.

Thus, the DPU 211 connects the backhaul network (fiber) 213 to the RGW 100 via the access network 210 and wireline 212. The RGW 100 connects the access network 210 to various CPE 221 via the in-home network 220 and wireline 222.

More details and aspects are mentioned in connection with the examples described above or below. The example shown in FIG. 2 may comprise one or more optional additional features corresponding to one or more aspects mentioned in connection with the proposed concept or one or more examples described above (e.g. FIG. 1) or below (e.g. FIGS. 3-8).

The transmissions by the access network transceivers and by the in-home network transceivers may be synchronized in time on symbol and transmission frame boundaries, so that efficient coordination and mutual crosstalk cancellation may improve performance of both networks in case of high crosstalk coupling between the access and in-home wirings occurs.

If the access network is not present (pure home networking, e.g. in case broadband is delivered to the RGW via fiber, such as fiber to the home (FTTH)), the in-home network can operate based on its own local timing and avoid limitations caused by coordination with the access network.

Figure 3:
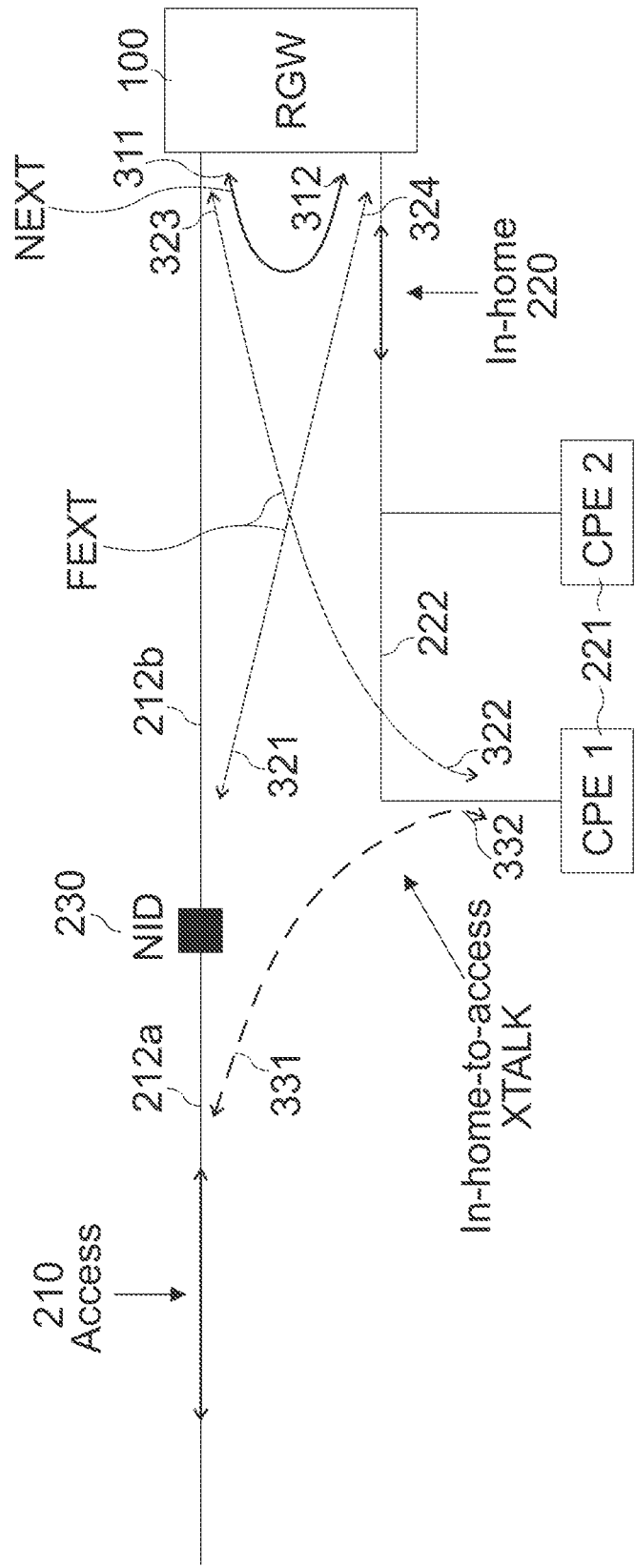
FIG. 3 shows a schematic illustration of crosstalk between wiring of an access network and an in-home network on separate channels.

FIG. 3 shows a schematic illustration of crosstalk between wiring of an access network 210 and an in-home network 220 on separate channels (e.g. wirelines 212b and 222 being different twisted pairs). The crosstalk channels between access wiring and in-home wiring are shown as Near-End Crosstalk (NEXT) (solid line), Far-End Crosstalk (FEXT) (dotted line), and Alien Crosstalk (XTALK) (dashed line).

Crosstalk refers to electromagnetic interference from a signal in one wire (e.g. from one unshielded twisted pair) to a signal in another wire (e.g. a second twisted pair). Generally, the two wires will be running in parallel (e.g. within a single cable). Near-End Crosstalk (NEXT) refers to interference between the two signals in the cables as measured at the same end of the cable with respect to the interfering transmitter. Far-End Crosstalk (FEXT) refers to interference between the two signals in the cables measured at the far end of the cable with respect to the interfering transmitter. Alien Crosstalk (XTALK) refers to interference caused by other cables routed close to the cable of interest, as opposed to signals contained within the same cable.

In the scenario shown in FIG. 3, the access and in-home networks use independent wiring (e.g. separate channels). As previously described, wirelines 212b and 222 may be separate wirelines within a cable or running in parallel, while wireline 212a may be a different cable routed near the cables containing wirelines 212b and 222, particularly around the NID 230. Thus, there exists NEXT and FEXT between wirelines 212b and 222 (e.g. wirelines within a cable or running in parallel), as well as XTALK between wirelines 212a and 222 (e.g. wirelines within separate cables which are routed nearby each other so as to interfere with each other). This results in the following 4 types of crosstalk components between access and in-home networks:

NEXT 311, 312 between in-home RGW and access (solid line in FIG. 3);

FEXT 321, 324 between in-home RGW and access (dotted line in FIG. 3);

FEXT 322, 323 between in-home CPE and access (dotted line in FIG. 3);

XTALK 331, 332 between in-home CPE and access (dashed line in FIG. 3).

NEXT results from RGW transmissions to the access or in-home networks on the near end of the RGW 100; specifically:

NEXT 311 results from RGW 100 transmissions to the CPE 221 via the in-home wireline 222 causing interference into the access wireline 212 on the near end of the RGW 100; and NEXT 312 results from RGW 100 transmissions to the access network (access US transmissions) via access wireline 212 causing interference into the in-home wireline 222 on the near end of the RGW 100.

FEXT results from RGW transmissions to the access or in-home networks as well as from transmissions to the RGW from the access or in-home networks; specifically:

FEXT 321 results from RGW transmissions to the CPE 221 via the in-home wireline 222 causing interference into the access wireline 212 on the far end of the interfering transmitter (on the far end of RGW 100);

FEXT 322 results from RGW transmissions to the access network (access US transmissions) via access wireline 212 causing interference into the in-home wireline 222 on the far end of the interfering transmitter (on the far end of RGW 100);

FEXT 323 results from CPE 221 transmissions to the RGW 100 via the in-home wireline 222 causing interference into the access wireline 212 on the far end of the interfering transmitter (on the far end of CPE 221; the near end of RGW 100); and FEXT 324 results from access DS transmissions (e.g. from the DPU) to the RGW 100 via the access wireline 212 causing interference into the in-home wireline 222 on the far end of the interfering transmitter (on the far end of the access network component; the near end of RGW 100).

XTALK results from transmissions within the in-home network line interfering with the access network line, or from transmissions within the access network line interfering with the in-home network line; specifically:

XTALK 331 results from transmissions between the RGW 100 and the in-home network 220 within wireline 222 (e.g. RGW 100 transmissions to the CPE 221 or CPE 221 transmissions to the RGW 100) causing interference into the access wireline 212a; and XTALK 332 results from transmissions between RGW 100 and the access network 210 within wireline 212a (e.g. RGW 100 transmissions to an access network component such as a DPU or transmissions from the access network component to the RGW 100) causing interference into the in-home network wireline 222.

Since access US transmitter and in-home RGW transmitter are co-located (e.g. both are located in RGW 100), and both in-home and access systems are synchronized and have same symbol rate and same tone spacing, FEXT resulting from the RGW transmissions into the access line (e.g. FEXT 322), as well as into the in-home lines (e.g. FEXT 321), can be pre-compensated at the RGW. Similarly, FEXT resulting from transmissions received at the RGW into the access line (e.g. FEXT 323), as well as into the in-home lines (e.g. FEXT 324), can be post-compensated at the RGW. Finally, NEXT between the access and the in-home lines at the RGW (e.g. resulting from RGW transmissions) can be canceled in a manner analogous to the cancellation of FEXT by pre-compensation.

Overall, the following crosstalk components can be cancelled:

NEXT 311, 312 between in-home RGW and access (solid line in FIG. 2);

FEXT 321, 324 between in-home RGW and access (dotted line in FIG. 2);

FEXT 322, 323 between in-home CPE and access (dotted line in FIG. 2).

NEXT 311, 312 due to RGW transmissions (e.g. access US or to the CPE) causing near end crosstalk into RGW reception (e.g. access DS or from the CPE) may be cancelled by compensating for such effects at the RGW. Since both signals are co-located at the RGW, and since both signals are synchronized, the RGW may detect the crosstalk effects of a transmission signal onto a received signal by detecting changes in the received signal which occur during (or as the result of) transmission. In other words, the RGW may monitor the received signal while no transmissions are being made, and then continue to monitor any changes in the received signal which occur once the RGW begins transmission. Based on these changes, the RGW can then predict the NEXT crosstalk influence caused by the transmit signal. Based on these detected crosstalk influences, the RGW could then compensate for the predicted NEXT accordingly (either by post-compensating the received signal or by pre-compensating the transmit signal). Since NEXT 311, 312 both occur as the result of transmissions to and from the RGW, both can be cancelled in an analogous manner.

FEXT 321, 322 between in-home and access (dotted lines in FIG. 3) that is due to RGW transmission (transmissions sent by the RGW) may be cancelled (pre-compensated) by the RGW precoder. To train the RGW precoder (which serves both access and in-home lines), channel estimation feedback (e.g., error samples or Discrete Fourier Transform (DFT) samples) is required at the RGW both from the CPEs of the in-home network and from the access US receiver (which is at the DPU). In other words, the CPE and/or DPU may provide the RGW a predicted error resulting from the interfering crosstalk (for example, based on a known or expected calibration sequence). The RGW may then determine the inverse of this and apply it to outgoing transmissions, pre-compensating for FEXT that will occur to those transmissions by the time it reaches the far end of the transmission line (e.g. to the CPE and/or DPU). In one example, this feedback is generated using measurements on probe sequences transmitted by the RGW. Since the access and in-home network components are synchronized in time and symbol transmissions, deviations from these synchronizations may be determined at the CPE and/or DPU based on probe sequence transmissions sent to them from the RGW. The CPE and/or DPU may be able to determine channel estimation feedback based on differences between the expected probe sequences and the actual received probe sequences. Based on this known channel estimation feedback, an inverse may be determined to cancel out the known or predicted interference/crosstalk.

FEXT 321, 322 result from transmissions sent by the RGW. Once the error is determined, its inverse may be applied to transmissions before they are sent out to pre-emptively cancel out any crosstalk effects that would result. Thus, transmissions from the RGW 100 to the CPE 221 which cause FEXT 321 in the access line 212 may be pre-compensated by applying the inverse as determined based on feedback provided by the access network component (e.g. DPU) to pre-compensate for FEXT 321 that will occur in that line as a result of the RGW transmission. Similarly, FEXT 322 resulting in the in-home line 222 may be pre-compensated for in RGW 100 transmissions to the access network component (access US transmissions) by applying the inverse as determined based on feedback provided by the CPE 221.

FEXT 323, 324 between in-home and access (dotted line in FIG. 3) that is due to CPE and access downstream transmissions (e.g. transmissions received at the RGW), is cancelled by the RGW post-coder (equalizer). To train the RGW post-coder (or post-canceller, which serves both access and in-home lines), channel estimation feedback (e.g., error samples or DFT samples) is required. The RGW may determine the channel estimation feedback based on information provided to it by the CPE and/or DPU (for example, based on a known or expected calibration sequence).

In one example, probe sequences are transmitted by the CPEs and in the access DS (by the transceiver at the DPU). Similar to pre-compensation (above), since the access and in-home network components are synchronized in time and symbol transmissions, deviations from these synchronizations may be determined at the RGW based on probe sequence transmissions sent to it from the CPE and/or DPU. The RGW may be able to determine channel estimation feedback based on differences between the expected probe sequences and the actual received probe sequences. Based on this known channel estimation feedback, an inverse may be determined and applied to the received transmissions (post-compensated) to cancel out the predicted interference/crosstalk.

FEXT 323, 324 result from transmissions received at the RGW (as opposed to those sent by it). Transmissions to the RGW 100 from the CPE 221 which cause FEXT 323 in the access line 212 as a result of the transmission may be post-compensated by applying the inverse based on channel estimation feedback determined by the RGW based on probe sequences transmitted to RGW by the DPU. Similarly, FEXT 324 resulting in the in-home line 222 due to access DS transmissions to the RGW may be post-compensated at the RGW by applying the inverse based on channel estimation feedback determined by the RGW based on probe sequences transmitted to the RGW by the CPE.

Summarizing, FEXT 321, 322 resulting from RGW transmissions may be pre-compensated for based on channel estimation feedback provided to the RGW by the CPE and/or DPU. The pre-compensation channel estimation feedback may be based on probe sequences transmitted to the CPE and/or DPU by the RGW. FEXT 323, 324 resulting from transmissions received at the RGW may be post-compensated for based on channel estimation feedback determined at the RGW. The post-compensation channel estimation feedback may be based on probe sequences transmitted to the RGW by the CPE and/or DPU.

The XTALK 331, 332 signals between the in-home CPEs and access US (dashed line in FIG. 3) are more difficult to cancel. Sufficient isolation between them may reduce this interference. To minimize the negative effect of this crosstalk type, transmit spectrum shaping (e.g. resource division duplexing or frame alternation) of CPE transmission signals can be used, as well as coordination of in-home and access networks transmission in time (see FIG. 4).

For FEXT cancellation with the RGW precoder as well as for spectrum shaping to reduce XTALK between the CPEs and the DPU, channel estimation feedback from the DPU and from the CPEs towards the RGW is required for crosstalk channel estimation at the RGW. This is distinct from the channel estimation feedback from the RGW towards the DPU, which is required for FEXT cancellation between different access lines (between different RGW, see FIG. 2) by crosstalk precoding and post-coding at the DPU side.

The most vulnerable point for the access network at the RGW is when downstream (DS) transmission occur (due to high attenuation of the access line). Coordination between access and in-home networks helps. For instance, if in-home transmissions from the RGW are aligned by symbol boundaries with access DS reception, the crosstalk from in-home RGW transmissions can be cancelled in access DS transmission. During access upstream (US) transmission, both DS and US in-home transmissions (e.g. RGW transmissions and/or CPE transmissions) cause FEXT into access US receiver at the DPU, substantial part of which can be cancelled as well. The non-cancelled talk is the crosstalk from the CPE transmitter to the US access reception. This non-cancelled part of the mentioned FEXT is much less harmful to access transmission.

In case when the in-home and the access networks use separate channels/media, e.g., two different twisted pairs, most of the crosstalk between in-home and the access networks can be cancelled, and so both can operate with time and frequency overlap.

More details and aspects are mentioned in connection with the examples described above or below. The example shown in FIG. 3 may comprise one or more optional additional features corresponding to one or more aspects mentioned in connection with the proposed concept or one or more examples described above (e.g. FIGS. 1-2) or below (e.g. FIGS. 4-8).

Figure 4:
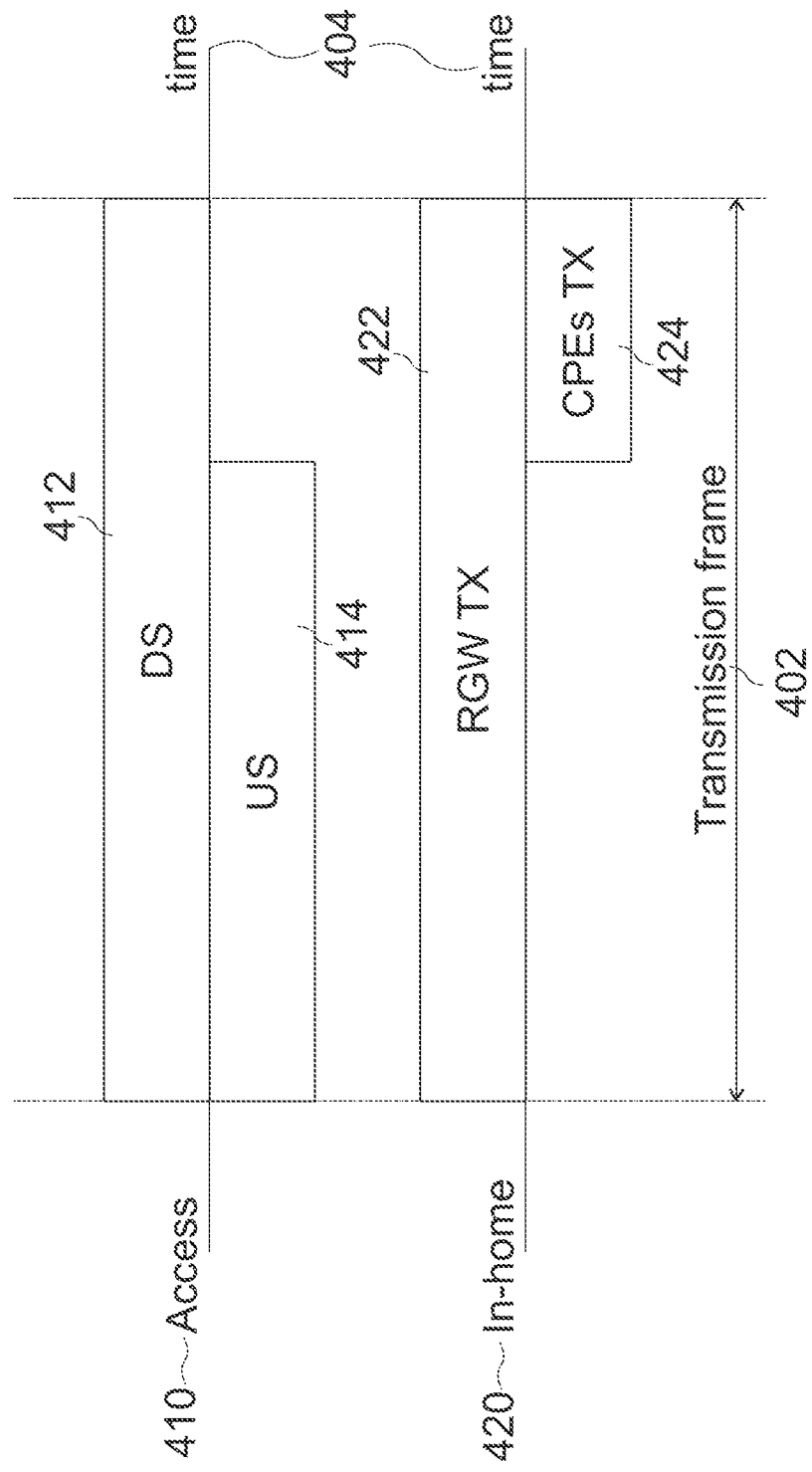
FIG. 4 shows a means of interference avoidance by frame formatting for transmissions on separate channels.

FIG. 4 shows a means of interference avoidance by frame formatting for transmissions on separate channels. A single transmission frame 402 is illustrated along a time axis 404 for transmissions in both the access network 410 and the in-home network 420. The access network 410 comprises access DS transmissions 412 and access US transmissions 414. The in-home network comprises RGW transmissions 422 and CPE transmissions 424.

Access DS transmissions 412 and RGW transmissions 422 may be transmitted simultaneously because both signals are known by the RGW (e.g. the DS transmissions 412 are received by the RGW and the RGW transmissions 422 are sent from the RGW). Since the RGW knows both signals, it can compensate for crosstalk resulting between them.

However, the same is not true for access US transmissions 414 and CPE transmissions 424. CPE transmissions 424 may cause crosstalk into access US transmissions 414. Since the access network component receiving the US transmission 414 is not aware of CPE transmissions 424 (e.g. CPE transmissions 424 never reach or interact with the access network), the access network component is not able compensate for this type of crosstalk.

Thus, in some examples, no CPE transmission 424 is allowed during access US transmission 414 (e.g. they are separated in the time domain). If the two transmissions occur at different times, then they will not interfere with each other. This scenario is presented in FIG. 4. The total transmission time (of a given transmission frame 402) may be divided between in-home CPE transmission and access US transmission. The access downstream transmission and RGW transmission can be done during entire transmission frame. Echo cancellation at the RGW allows full duplex transmission in both access and in-home networks.

Additionally, or alternatively, in another example, access US and CPEs may use different subcarriers (e.g. they are separated in the frequency domain) while both transmit during entire transmission frame. In yet another example, CPEs may be limited in both frequency domain (use certain subset of subcarriers) and time domain (use reduced Power Spectrum Density (PSD) or muted transmission during access US transmission. In other words, resource division multiplexing (time, frequency, etc.) may be implemented to avoid interfering signals which cannot be efficiently cancelled.

If the access network is not present or disconnected (pure home networking, e.g., fiber to the home), then the in-home network can operate in full duplex, and CPE transmissions 424 can be extended to the entire transmission frame. When access is connected, CPE transmission time and transmit PSD is reconfigured, as it may be reconfigured every time new CPE is connected. Thus, the CPE transmission time and power may be dependent upon the influence of the (interfering) access signal. If the access interference is not present, full CPE transmission may be enabled.

More details and aspects are mentioned in connection with the examples described above or below. The example shown in FIG. 4 may comprise one or more optional additional features corresponding to one or more aspects mentioned in connection with the proposed concept or one or more examples described above (e.g. FIGS. 1-3) or below (e.g. FIGS. 5-8).

There are cases in which both access and in-home use the same wiring (since no other may be available and it may not be possible to separate between them). This case is shown in FIG. 5.

Figure 5:
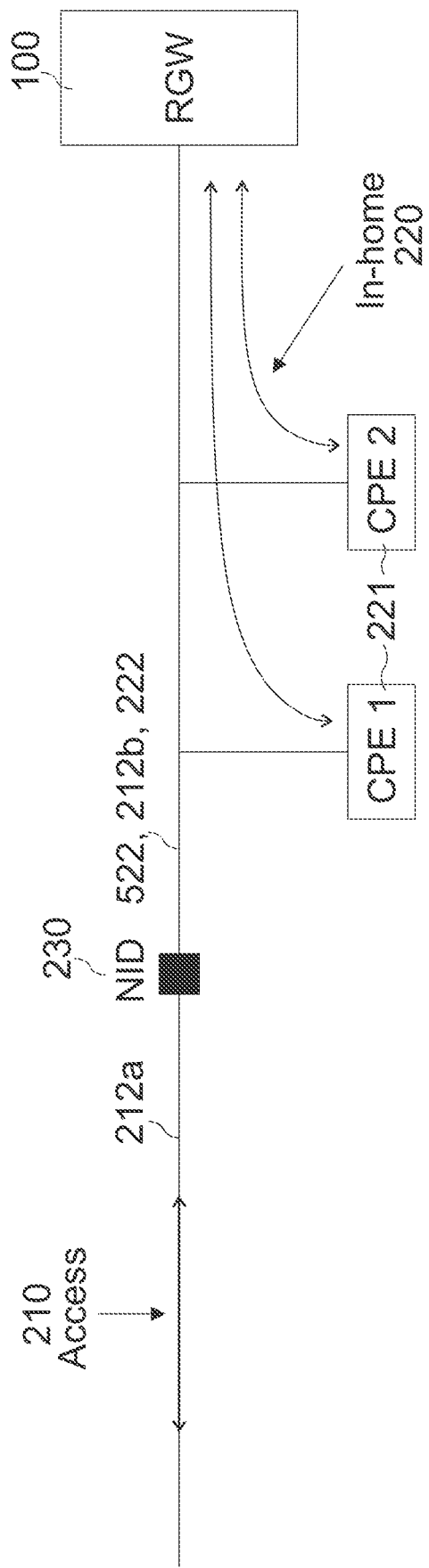
FIG. 5 shows a schematic illustration of an RGW connecting an access network to an in-home network on the same channel.

FIG. 5 shows a schematic illustration of an RGW 100 connecting an access network 210 to an in-home network 220 on the same channel/wiring (e.g. wirelines 212b and 222 are the same twisted pair, labeled collectively as wireline 522). In this example, there is no NEXT or FEXT crosstalk to consider since both access and in-home networks are using the same physical wiring. However, local echo and conflicting transmissions must be accounted for.

In the case presented in FIG. 5, there is a possibility for cancelling of local echo and local transmission in the received signal. That means specifically:

RGW transmission doesn't bother access DS reception; access US transmission doesn't bother RGW reception.

Signals travelling in opposite directions along the same wireline generally don't interfere. However, signals travelling in the same direction overlapping in time and/or frequency may cause interference. Any two signals which overlap for at least a portion of the signal path in the same direction may interfere with each other to at least some extent. Thus, CPE transmissions may interfere with access US reception (e.g. at the DPU) and access DS reception (at the RGW 100) and access US and DS transmissions may interfere with CPE reception (at the CPE 211).

It's very difficult to cancel interference into access (US and DS) during CPE transmission. Similarly, it is very difficult to cancel interference into CPE reception during access US transmission. To avoid these strong interferences, the relevant signals may be separated in frequency or in time, or both. An example of time separation is presented in FIG. 6.

More details and aspects are mentioned in connection with the examples described above or below. The example shown in FIG. 5 may comprise one or more optional additional features corresponding to one or more aspects mentioned in connection with the proposed concept or one or more examples described above (e.g. FIGS. 1-4) or below (e.g. FIGS. 6-8).

Figure 6:
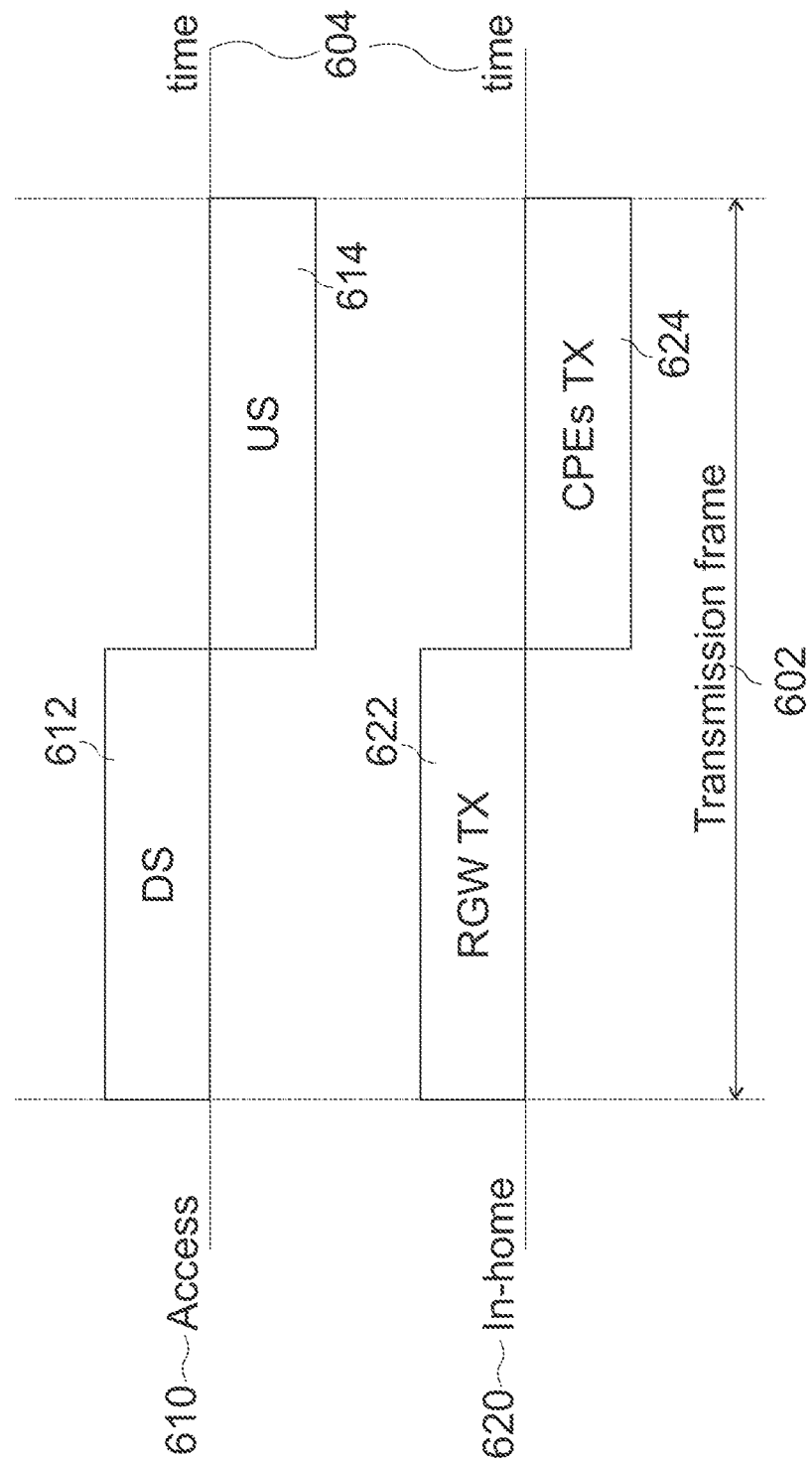
FIG. 6 shows a means of interference avoidance by frame formatting for transmissions on the same channel.

FIG. 6 shows a means of interference avoidance by frame formatting for transmissions on the same channel. A single transmission frame 602 is illustrated along a time axis 604 for transmissions in both the access network 610 and the in-home network 620. The access network 610 comprises access DS transmissions 612 and access US transmissions 614. The in-home network comprises RGW transmissions 622 and CPE transmissions 624.

By separating the signals such that only signals travelling in opposite directions are transmitted at the same time, the resulting interference may be reduced. Thus, access DS transmissions 612 and RGW transmissions 622 or access US transmissions 614 and CPE transmissions 624 may be transmitted at the same time. In this way, for example, the interference that would occur at RGW reception (by simultaneous transmission of access DS 612 and CPEs 624) can be avoided.

Unfortunately, even time separation presented in FIG. 6 doesn't mitigate interference completely, because their signals overlap for at least a portion of the signal path, such that the access DS signal still reaches CPEs receivers and CPE transmission signals still reach access the US receiver at the DPU. However, these signals are usually weak and can be further weakened substantially if the RGW is positioned appropriately in the premises as shown in FIG. 7.

More details and aspects are mentioned in connection with the examples described above or below. The example shown in FIG. 6 may comprise one or more optional additional features corresponding to one or more aspects mentioned in connection with the proposed concept or one or more examples described above (e.g. FIGS. 1-5) or below (e.g. FIGS. 7-8).

FIG. 7 shows an example of a position where the RGW may substantially reduce the interference discussed in relation to FIG. 6. FIG. 7 shows a schematic illustration of an RGW 100 connecting an access network 210 to an in-home network 220 on the same channel/wiring (e.g. wirelines 212b and 222 are the same twisted pair, labeled collectively as wireline 522). In contrast to the location of the RGW 100 in FIG. 5, the RGW 100 of FIG. 7 is located along the wireline 522 between the CPE 221 of the in-home network 220 and the access network 210 at the splicing point (NID 230) between access 210 and in-home 220 networks.

This is very different from the RGW location shown in FIG. 5. With the positioning of the RGW as shown in FIG. 7, both the access DS signal at the CPE receiver and the CPE transmission signal at the access US receiver get additional attenuation due to propagation through the in-home channel/wiring.

More details and aspects are mentioned in connection with the examples described above or below. The example shown in FIG. 7 may comprise one or more optional additional features corresponding to one or more aspects mentioned in connection with the proposed concept or one or more examples described above (e.g. FIGS. 1-6) or below (e.g. FIG. 8).

Alternatively, in another example, it may be possible to alternate the transmission frames of the access and in-home networks rather than the resource division illustrated in FIG. 6. The approach of frame alternation is illustrated in FIG. 8

FIG. 8 shows a schematic illustration of an example of alternating access and in-home transmission frames. Each transmission frame 802a, 802b, 802c, 802d is limited to either access network transmission/reception (e.g. access US/DS transmissions) or to in-home network transmission/reception (e.g. RGW transmission and CPE transmission). Each transmission frame may be of a varying duration, as shown by the differing widths of transmission frames 802a, 802b, 802c, 802d. For example, transmission frame 802b may be of a longer duration than transmission frame 802c. By limiting each transmission frame to one set of non-interfering signals (e.g. access US/DS), the interference resulting from their interactions can be avoided entirely.

The transmission frames of access and in-home may be alternated, such as they share the common channel/wire with no mutual interference. Since transmission frame boundaries of access and in-home transmissions are synchronized, there is no time loss. In the example of alternation presented in FIG. 8, the access and in-home transmission frames are of different duration and strictly alternate.

In another example, access frames and in-home frames can be of the same length and use different alternation patterns. Or a combination of different durations and different alternating patterns. However, duration of both frames shall follow the rules of synchronization, e.g., their duration shall be equal to an integer number of transmit symbols.

The frame alternation shown in FIG. 8 may be achieved by sending blank frames between active frames in both access line and in-home lines. Blank frames have no active symbol positions. In some examples, blank frames may include a limited set of active symbol positions to convey information that is not crosstalk sensitive (e.g., highly protected control or management information). These positions have to be aligned between the access transmitter and in-home transmitters to avoid distortions in user data.

More details and aspects are mentioned in connection with the examples described above or below. The example shown in FIG. 8 may comprise one or more optional additional features corresponding to one or more aspects mentioned in connection with the proposed concept or one or more examples described above (e.g. FIGS. 1-7).

Both in-home and access can use full duplex, partial full duplex transmission, or TDD, their transmission frame boundaries and their transmit symbol boundaries may be aligned, and their symbol timing may be synchronized. The latter implies that all symbols have the same duration (same symbol period and cyclic extension).

Both access network and in-home network can utilize (when appropriate) a full duplex (FD) transmission, e.g., simultaneous transmission of upstream and downstream. In cases this may not be appropriate (see examples in FIGS. 4 and 6), a TDD transmission or mixed TDD/FD transmission may be used. During FD or TDD transmission, both access and in-home networks can use same or different subcarriers or frequency bands to be utilized for transmission.

One typical future application requiring efficient high-speed in-home distribution is connecting residents through a 5G gateway using 5G wireless hot-spots or access points inside the premises.

Some applications merge the in-home network with the access network by pulling one of the in-home network nodes out of premises, up to the access head-end location, thus providing an access connection with multi-port termination inside the premises.

The present disclosure relates to the following topics:

System:
1. A wireline bandwidth distribution system including a point-to-point access system terminated at the residential gateway (RGW) and a point-to-multipoint in-home system, originated from the (RGW).
2. Both access and in-home systems may operate in full duplex (FD) mode or use TDD. Echo cancellation for FD and mutual frame alignment for TDD is provided by the RGW.
3. The RGW implements FEXT and NEXT cancellation and avoidance protocols, and special framing, and transmit spectrum shaping of the CPEs to mitigate relevant crosstalk components between the in-home and the access.
4. The in-home and access systems are synchronized to each other:
    the master clock of in-home system is synchronized with the master clock of the access system (loop timing);
    symbol periods and cyclic extensions of the in-home systems are set the same as for access system;
    symbol boundaries and transmission frame boundaries of in-home systems are aligned in time with the peer parameters of access system;

Wiring
1. The in-home and access systems may use same or different wiring. If they use the same wiring, performance of both networks depends on the location of the RGW; to reduce mutual interference RGW shall be located as close as possible to the entrance to the residence (close to the NID).

Crosstalk Cancellation and Avoidance
1. For the purpose of crosstalk cancellation, RGW preforms channel estimation between in-home and access network. For channel estimation, the RGW communicates relevant probe sequences into both in-home and access lines.
2. Probe sequences may be loaded on sync symbols, and sync symbols of both access and in-home networks are aligned in time at relevant reference points.
3. Channel estimation feedback is provided from the DPU and the CPEs to the RGW to measure crosstalk between DPU and the CPEs connected to the RGW.
4. In case specific crosstalk can't be cancelled, it is avoided by coordination between transmissions of in-home and access transceivers in time or in frequency or in both.
5. The head-end of the access network (DPU) is responsible for decisions related to mutual compromises in performance due to crosstalk cancellation and avoidance.

Transmission Frame
1. Transmission frames of access and in-home are aligned in time at relevant reference points.
2. The transmission frame of both access and in-home systems facilitates both full duplex (FD), and TDD, and partial FD (FD on some symbol positions of the transmission frame and TDD of others).
3. The transmission frame of both access and in-home systems comprises from integer number of symbol periods (positions).
4. Blank frames are used to alternate transmissions of frames in access network and in-home network in scenarios when both occupy the same wiring or mutual crosstalk cancellation by some reason is limited.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The skilled person having benefit from the present disclosure will appreciate that the various examples described herein can be implemented individually or in combination.

Example 1 is a residential gateway (RGW) connecting an access network to an in-home network, the residential gateway comprising an access network transceiver configured for a first communication with an access network component via a wireline; an in-home network transceiver configured for a second communication with an in-home network component via the same wireline or at least one further wireline; synchronization circuitry configured to synchronize a timing between the first and the second communication; and interference mitigation circuitry configured to mitigate interference between the first and the second communication based on the synchronized timing.

Example 2 is the RGW of example 1, wherein the first communication is via a first wireline and wherein the second communication is via a second wireline.

Example 3 is the RGW of example 2, wherein the synchronization circuitry is configured to schedule a transmission from the in-home network transceiver to the in-home network component simultaneously with a transmission from the access network component or the access network transceiver.

Example 4 is the RGW of example 2, wherein the synchronization circuitry is configured to schedule a transmission from the access network transceiver to the access network component at a different time from a transmission from the in-home network component to the in-home network transceiver.

Example 5 is the RGW of example 2, wherein the synchronization circuitry is configured to schedule a transmission from the access network transceiver to the access network component in a first frequency band simultaneously to a transmission from the in-home network component to the in-home network transceiver in a second frequency band not overlapping the first frequency band.

Example 6 is the RGW of example 2, further comprising channel estimation circuitry configured to estimate at least one crosstalk estimate associated with a crosstalk between the first and the second wireline, wherein the interference mitigation circuitry is configured to compensate for crosstalk between the first and the second wireline based on the crosstalk estimate and based on the first and second communications.

Example 7 is the RGW of example 6, wherein the channel estimation circuitry is configured to obtain the at least one crosstalk estimate based on channel estimation feedback, wherein the channel estimation feedback is based on one or more transmitted or received predefined probe sequences.

Example 8 is the RGW of example 7, wherein the channel estimation circuitry is configured to transmit predefined probe sequences via the first and/or the second wireline and to receive channel estimation feedback from the access network component and/or the in-home network component, respectively.

Example 9 is the RGW of example 7, wherein the channel estimation circuitry is configured to receive predefined probe sequences via the first and/or the second wireline from the access network component and/or the in-home network component, respectively and to estimate the channel estimation feedback based on the received probe sequences.

Example 10 is the RGW of example 1, wherein the first communication and the second communication are via the same wireline.

Example 11 is the RGW of example 10, wherein the residential gateway is located between the access network component and the in-home network component.

Example 12 is the RGW of example 1, wherein the interference mitigation circuitry is configured to schedule the first communication alternatingly to the second communication.

Example 13 is the RGW of example 12, wherein the first communication transmits blank transmission frames during active transmission of the second communication, and wherein the second communication transmits blank transmission frames during active transmission of the first communication.

Example 14 is the RGW of example 1, wherein the synchronization circuitry is configured to align the time position of symbols of the first and the second communication to a timing controlled by the access network component.

Example 15 is the RGW of example 1, wherein the residential gateway is loop-timed to the access network component and wherein the in-home network component is loop-timed to the residential gateway.

Example 16 is the RGW of example 1, wherein the synchronization circuitry is configured to synchronize the duration of transmission frames of the first and the second communication to be equal to an integer number of transmit symbols.

Example 17 is the RGW of example 1, wherein the residential gateway defers to the access network in resolving compromises with respect to crosstalk compensation.

Example 18 is a method for mitigating crosstalk between an access network and an in-home network, the method comprising synchronizing a first communication via a first wireline with an access network component to a second communication via a second wireline with an in-home network component in time on symbol and transmission frame boundaries; determining channel estimation feedback along the first and the second wirelines; estimating a crosstalk estimate based on channel estimation feedback; and compensating for crosstalk between the first wireline and the second wireline based on the crosstalk estimate and the first communication and the second communication.

Example 19 is the method of example 18, further comprising avoiding interference between the first and the second communication via resource division duplexing.

Example 20 is the method of example 18, wherein the channel estimation feedback is based on probe sequences transmitted or received by the access network and the in-home network.

Example 21 is a residential gateway connecting an access network to an in-home network, the residential gateway comprising an access network transceiver configured for a first communication with an access network component via a first wireline; an in-home network transceiver configured for a second communication with an in-home network component via a second wireline; synchronization circuitry configured to synchronize a timing between the first and the second communication; channel estimation circuitry configured to estimate at least one crosstalk estimate associated with a crosstalk between the first and the second wireline; interference mitigation circuitry configured to compensate for crosstalk between the first and the second wireline based on the crosstalk estimate and based on the first and second communications, wherein the channel estimation circuitry is configured to obtain the at least one crosstalk estimate based on channel estimation feedback.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

LIST OF REFERENCE NUMERALS

100—Residential Gateway (RGW)
210—Access network
211—Distribution Point Unit (DPU)
212—Access network wireline
213—Backhaul network (fiber)
214—Wirelines to other residences
220—In-home network
221—Consumer Premise Equipment (CPE)
222—In-home network wireline
311, 312—NEXT
321, 322, 323, 324—FEXT
331. 332—XTALK
402—Transmission frame
404—Time axis
410—Access network transmissions
412—Access DS transmission
414—Access US transmission
420—In-home network transmissions
422—RGW transmissions
424—CPE transmissions
522—Wireline
602—Transmission frame
604—Time axis
610—Access network transmissions
612—Access DS transmission
614—Access US transmission 620—In-home network transmissions
622—RGW transmissions
624—CPE transmissions
802—Transmission frames

What is claimed is:

1. A residential gateway for connecting an access network to an in-home network, the residential gateway comprising:
    an access network transceiver configured for a first communication with an access network component via a wireline;
    an in-home network transceiver configured for a second communication with an in-home network component via the same wireline or at least one further wireline;
    synchronization circuitry configured to synchronize a timing between the first and the second communication; and
    interference mitigation circuitry configured to mitigate interference between the first and the second communication based on the synchronized timing
    wherein the first communication is via a first wireline and wherein the second communication is via a second wireline,
    wherein the residential gateway further comprising:
    channel estimation circuitry configured to estimate at least one crosstalk estimate associated with a crosstalk between the first and the second wireline,
    wherein the interference mitigation circuitry is configured to compensate for crosstalk between the first and the second wireline based on the crosstalk estimate and based on the first and second communications,
    wherein the channel estimation circuitry is configured to obtain the at least one crosstalk estimate based on channel estimation feedback, wherein the channel estimation feedback is based on one or more transmitted or received predefined probe sequences,
    wherein the channel estimation circuitry is configured to transmit predefined probe sequences via the first and/or the second wireline and to receive channel estimation feedback from the access network component and/or the in-home network component, respectively.

2. The residential gateway of claim 1, wherein the synchronization circuitry is configured to schedule a transmission from the in-home network transceiver to the in-home network component simultaneously with a transmission from the access network component or the access network transceiver.

3. The residential gateway of claim 1, wherein the synchronization circuitry is configured to schedule a transmission from the access network transceiver to the access network component at a different time from a transmission from the in-home network component to the in-home network transceiver.

4. The residential gateway of claim 1, wherein the synchronization circuitry is configured to schedule a transmission from the access network transceiver to the access network component in a first frequency band simultaneously to a transmission from the in-home network component to the in-home network transceiver in a second frequency band not overlapping the first frequency band.

5. The residential gateway of claim 1, wherein the channel estimation circuitry is configured to receive predefined probe sequences via the first and/or the second wireline from the access network component and/or the in-home network component, respectively and to estimate the channel estimation feedback based on the received probe sequences.

6. The residential gateway of claim 1, wherein the first communication and the second communication are via the same wireline.

7. The residential gateway of claim 6, wherein the residential gateway is located between the access network component and the in-home network component.

8. The residential gateway of claim 1, wherein the interference mitigation circuitry is configured to schedule the first communication alternatingly to the second communication.

9. The residential gateway of claim 8, wherein the first communication transmits blank transmission frames during active transmission of the second communication, and wherein the second communication transmits blank transmission frames during active transmission of the first communication.

10. The residential gateway of claim 1, wherein the synchronization circuitry is configured to align the time position of symbols of the first and the second communication to a timing controlled by the access network component.

11. The residential gateway of claim 1, wherein the residential gateway is loop-timed to the access network component and wherein the in-home network component is loop-timed to the residential gateway.

12. The residential gateway of claim 1, wherein the synchronization circuitry is configured to synchronize the duration of transmission frames of the first and the second communication to be equal to an integer number of transmit symbols.

13. The residential gateway of claim 1, wherein the residential gateway defers to the access network in resolving compromises with respect to crosstalk compensation.

14. A method for mitigating crosstalk between an access network and an in-home network, the method comprising:
    synchronizing a first communication via a first wireline with an access network component to a second communication via a second wireline with an in-home network component in time on symbol and transmission frame boundaries;
    determining channel estimation feedback along the first and the second wirelines;
    estimating a crosstalk estimate based on channel estimation feedback; and
    compensating for crosstalk between the first wireline and the second wireline based on the crosstalk estimate and the first communication and the second communication,
    wherein the channel estimation feedback is based on one or more transmitted or received predefined probe sequences,
    wherein predefined probe sequences are transmitted via the first wireline and/or the second wireline using a residential gateway connecting the access network to the in-home network and the channel estimation feedback is received from the access network component and/or the in-home network component, respectively.

15. The method of claim 14, further comprising avoiding interference between the first and the second communication via resource division duplexing.

16. The method of claim 14, wherein the channel estimation feedback is based on probe sequences transmitted or received by the access network and the in-home network.

* * * * *